(12) United States Patent
Yamauchi et al.

(10) Patent No.: US 9,017,870 B2
(45) Date of Patent: Apr. 28, 2015

(54) NEGATIVE ELECTRODE MATERIAL FOR AN ELECTRICAL STORAGE DEVICE, AND NEGATIVE ELECTRODE FOR AN ELECTRICAL STORAGE DEVICE USING THE SAME

(75) Inventors: Hideo Yamauchi, Otsu (JP); Tomohiro Nagakane, Otsu (JP); Akihiko Sakamoto, Otsu (JP); Tetsuo Sakai, Ikeda (JP); Meijing Zou, Ikeda (JP)

(73) Assignees: Nippon Electric Glass Co., Ltd., Shiga (JP); National Institute of Advanced Industrial Science and Technology, Tokyo (JP)

( * ) Notice: Subject to any disclaimer, the term of this patent is extended or adjusted under 35 U.S.C. 154(b) by 462 days.

(21) Appl. No.: 13/510,338

(22) PCT Filed: Nov. 19, 2010

(86) PCT No.: PCT/JP2010/070694
§ 371 (c)(1),
(2), (4) Date: Jul. 13, 2012

(87) PCT Pub. No.: WO2011/065307
PCT Pub. Date: Jun. 3, 2011

(65) Prior Publication Data
US 2012/0276448 A1   Nov. 1, 2012

(30) Foreign Application Priority Data

Nov. 25, 2009 (JP) ................................ 2009-267373

(51) Int. Cl.
| | |
|---|---|
| *H01M 4/62* | (2006.01) |
| *H01M 4/36* | (2006.01) |
| *H01M 4/04* | (2006.01) |
| H01M 4/13 | (2010.01) |
| H01M 4/02 | (2006.01) |
| H01M 4/131 | (2010.01) |
| H01M 4/1391 | (2010.01) |
| H01M 4/485 | (2010.01) |
| H01M 10/052 | (2010.01) |

(52) U.S. Cl.
CPC .............. *H01M 4/622* (2013.01); *H01M 4/13* (2013.01); *H01M 4/364* (2013.01); *H01M 2004/027* (2013.01); *H01M 4/0404* (2013.01); *H01M 4/0471* (2013.01); *H01M 4/131* (2013.01); *H01M 4/1391* (2013.01); *H01M 4/485* (2013.01); *H01M 4/625* (2013.01); *H01M 10/052* (2013.01); *Y02E 60/122* (2013.01); *Y02T 10/7011* (2013.01)

(58) Field of Classification Search
CPC ....... H01M 4/622; H01M 4/364; H01M 4/13; H01M 4/0404; H01M 4/0471; H01M 4/625; H01M 4/485; H01M 4/131; H01M 4/1391; H01M 10/052; H01M 2004/027; Y02E 60/122; Y02T 10/7011
USPC ................... 429/218.1, 217, 209, 232, 233; 252/182.1
See application file for complete search history.

(56) References Cited

U.S. PATENT DOCUMENTS

| | | | |
|---|---|---|---|
| 5,618,640 | A | 4/1997 | Idota et al. |
| 5,707,756 | A | 1/1998 | Inoue et al. |
| RE35,818 | E | 6/1998 | Tahara et al. |
| 2009/0162750 | A1 | 6/2009 | Kawakami et al. |
| 2009/0269677 | A1 | 10/2009 | Hirose et al. |

FOREIGN PATENT DOCUMENTS

| | | |
|---|---|---|
| JP | 8-236158 | 9/1996 |
| JP | 8-298121 | 11/1996 |
| JP | 2887632 | 4/1999 |
| JP | 2002-231209 | 8/2002 |
| JP | 3498380 | 2/2004 |
| JP | 2004-349016 | 12/2004 |
| JP | 3890671 | 3/2007 |
| JP | 2008-153117 | 7/2008 |
| JP | 2009-164104 | 7/2009 |
| JP | 2009-266473 | 11/2009 |

OTHER PUBLICATIONS

Hayashi et al. "All-solid-state rechargeable lithium batteries using SnX-P2X5 (X-S and O) amorphous negative electrodes". Res.Chem. Intermed., vol. 32, No. 5-6, pp. 497-506, 2006.*
International Search Report issued Dec. 28, 2010 in International (PCT) Application No. PCT/JP2010/070694.
International Preliminary Report on Patentability and Written Opinion of the International Searching Authority issued Jun. 14, 2012 in International (PCT) Application No. PCT/JP2010/070694.

* cited by examiner

*Primary Examiner* — Laura Weiner
(74) *Attorney, Agent, or Firm* — Wenderoth, Lind & Ponack, L.L.P.

(57) ABSTRACT

Provided is a negative electrode material for an electricity storage device, comprises, a negative electrode active material comprising a compound containing at least SnO and $P_2O_5$, and a binder comprising a thermosetting resin. Also provided is a negative electrode for an electricity storage device, comprising a current collector having a surface coated with the negative electrode material for an electricity storage device. Further provided is a method of producing the negative electrode for an electricity storage device, the method comprising the steps of: coating the surface of the current collector with the negative electrode material for an electricity storage device; and carrying out heat treatment of the current collector at 150 to 400° C. under reduced pressure.

5 Claims, No Drawings

NEGATIVE ELECTRODE MATERIAL FOR AN ELECTRICAL STORAGE DEVICE, AND NEGATIVE ELECTRODE FOR AN ELECTRICAL STORAGE DEVICE USING THE SAME

TECHNICAL FIELD

The present invention relates to a negative electrode material for an electricity storage device such as a non-aqueous lithium ion secondary battery used for portable electronic devices, electric vehicles, and the like.

BACKGROUND ART

In recent years, owing to widespread use of portable personal computers and portable phones, it has been highly demanded to develop a lithium ion secondary battery having a higher capacity and a reduced size. If a lithium ion secondary battery has a higher capacity, reduction in size of a battery material can be facilitated, and hence the development of an electrode material for a lithium ion secondary battery is urgently needed in order to accomplish the higher capacity.

High potential type materials such as $LiCoO_2$, $LiCo_{1-x}Ni_xO_2$, $LiNiO_2$, and $LiMn_2O_4$ are each widely used for a positive electrode material for a lithium ion secondary battery, and on the other hand, a carbonaceous material is generally used for a negative electrode material. These materials function as electrode active materials that reversibly store and release lithium ions through charge and discharge, and construct a so-called rocking chair type secondary battery in which both electrodes are electrochemically connected through a non-aqueous electrolytic solution or a solid electrolyte.

Examples of the carbonaceous material used as a negative electrode material include a graphite carbon material, pitch coke, fibrous carbon, and high-capacity type soft carbon prepared by low-temperature firing. However, the carbonaceous material has a relatively small lithium insertion capacity, and hence involves a problem in that a battery using the carbonaceous material has a low capacity. Specifically, even if a lithium insertion capacity in a stoichiometric amount is attained, the upper limit of the capacity of the battery using the carbon material is about 372 mAh/g.

In view of the foregoing, there is proposed a negative electrode material containing SnO as a negative electrode material that is capable of storing and releasing lithium ions and has a higher capacity density than the carbon-based material (see, for example, Patent Literature 1). However, the negative electrode material described in Patent Literature 1 involves a problem in that the material is not capable of sufficiently abating the volume change thereof attributed to the storage and release reactions of lithium ions, and thus is extremely poor in charge-discharge cycle performance.

In view of the foregoing, there are proposed a negative electrode material formed of a complex oxide mainly containing tin oxide and a method of producing the negative electrode material by a melting method (see, for example, Patent Literature 2). In addition, as a method of producing a negative electrode material which is formed of a complex oxide containing tin oxide and silicon oxide, is homogeneous, and has a large specific surface area, there is proposed a production method using a sol-gel method (see, for example, Patent Literature 3).

CITATION LIST

Patent Literature

Patent Literature 1: JP 2887632 B2
Patent Literature 2: JP 3498380 B2
Patent Literature 3: JP 3890671 B2

SUMMARY OF INVENTION

Technical Problem to be Solved

The negative electrode material proposed in each of the above-mentioned patent literatures is not capable of abating the volume change thereof attributed to the storage and release reactions of lithium ions at the time of charge and discharge. As a result, repeated charge and discharge causes remarkable degradation of the structure of the negative electrode material, and hence a crack is liable to occur. If the crack develops, a void is formed in the negative electrode material in some cases, and the negative electrode material may come into fine powder. When a crack occurs in the negative electrode material, an electron-conducting network is divided, which results in a problem of a reduction in discharge capacity after repeated charge and discharge (cycle performance).

Moreover, in the negative electrode material proposed in each of the above-mentioned patent literatures, a thermoplastic straight-chain polymer such as polyvinylidene fluoride (PVDF) or polytetrafluoroethylene (PTFE) is used as a binder. In the negative electrode material, the negative electrode active materials are bound to each other by the straight-chain polymer in the state of, so to speak, being intertwined two-dimensionally, and hence has weak bondability. Thus, the negative electrode active materials are detached from the negative electrode material due to the volume change thereof at the time of charge and discharge, which is also liable to result in a reduction in the cycle performance.

Thus, the present invention has been made in view of the circumstances described above, and has an object to provide a negative electrode material for an electricity storage device which is excellent in the cycle performance.

Solution to Problem

The inventors of the present invention have made various studies. As a result, the inventors have found that the problems can be solved by providing a negative electrode material which comprises a negative electrode active material containing at least SnO and $P_2O_5$ and a specific resin as a binder, and propose the finding as the present invention.

That is, the present invention relates to a negative electrode material for an electricity storage device, comprising a negative electrode active material comprising a compound containing at least SnO and $P_2O_5$ and a binder comprising a thermosetting resin.

It is known that, in a lithium ion secondary battery, which is one example of a non-aqueous secondary battery exemplified as an electricity storage device, the following reactions take place in its negative electrode at the time of charge and discharge.

$$Sn^{x+} + xe^- \rightarrow Sn \qquad (1)$$

$$Sn + yLi^+ + ye^- \longleftrightarrow Li_ySn \qquad (2)$$

First, at the time of initial charge, an irreversible reaction in which a $Sn^{x+}$ ion ($0 < x \leq 4$) receives an electron, generating metal Sn, takes place (formula (1)). Subsequently, there occurs a reaction in which the generated metal Sn is bound to a Li ion that has transferred from the positive electrode through an electrolytic solution and an electron supplied from a circuit, forming a Sn—Li alloy. The reaction occurs as a reversible reaction in which a reaction proceeds in the right direction at the time of charge and a reaction proceeds in the left direction at the time of discharge (formula (2)).

Here, attention is paid to the reaction of the formula (1) which takes place at the time of the initial charge. As the energy which is necessary for causing the reaction is smaller, an initial charge capacity becomes smaller, resulting in excellent initial charge-discharge efficiency. Thus, as the valence of a $Sn^{x+}$ ion is smaller, the number of electrons necessary for reduction becomes smaller, and hence a smaller valence is advantageous for improving the initial charge-discharge efficiency of a secondary battery.

By the way, when a $Sn^{x+}$ ion is formed into a $Li_ySn$ alloy at the time of initial charge, a negative electrode material stores y pieces of lithium ions released from a positive electrode material, resulting in the volume expansion thereof. This volume change can be calculated in terms of crystallography. For example, a SnO crystal has a tetragonal system whose crystal unit cell has lengths of 3.802 Å by 3.802 Å by 4.836 Å, and hence its crystal unit volume comes to 69.9 Å$^3$. The crystal unit cell comprises two Sn atoms, and hence the occupied volume of one Sn atom comes to 34.95 Å$^3$. On the other hand, there are known, as the $Li_ySn$ alloy formed at the time of charge, alloys of $Li_{2.6}Sn$, $Li_{3.5}Sn$, $Li_{4.4}Sn$, and the like. When a case where a $Li_{4.4}Sn$ alloy is formed at the time of charge is taken as an example, the unit cell of $Li_{4.4}Sn$ (cubic system, space group F23) has lengths of 19.78 Å by 19.78 Å by 19.78 Å, and hence its cell unit volume comes to 7739 Å$^3$. The unit cell comprises 80 Sn atoms, and hence the occupied volume of one Sn atom comes to 96.7 Å$^3$. Thus, when a SnO crystal is used for a negative electrode material, the occupied volume of the Sn atom expands 2.77-fold (96.7 Å$^3$/34.95 Å$^3$) at the time of initial charge.

Next, at the time of discharge, the reaction in the formula (2) proceeds in the left direction and y pieces of Li ions and y pieces of electrons are released from the $Li_ySn$ alloy, forming metal Sn, and hence the volume of the negative electrode material contracts. In this case, the contraction rate of the volume is calculated in terms of crystallography as described previously. Metal Sn has a tetragonal system whose unit cell has lengths of 5.831 Å by 5.831 Å by 3.182 Å, and hence its unit cell volume comes to 108.2 Å$^3$. The unit cell comprises four Sn atoms, and hence the occupied volume of one Sn atom comes to 27.05 Å$^3$. Thus, when the $Li_ySn$ alloy is a $Li_{4.4}Sn$ alloy, a discharge reaction proceeds in the negative electrode material, generating metal Sn, and consequently, the occupied volume of the Sn atom contracts 0.28-fold (27.5 Å$^3$/96.7 Å$^3$).

Further, at the time of a second charge onward, the reaction in the formula (2) proceeds in the right direction and metal Sn stores y pieces of Li ions and y pieces of electrons, generating a $Li_ySn$ alloy, and hence the volume of the negative electrode material expands. In this case, when the metal Sn is formed into $Li_{4.4}Sn$, the occupied volume of the Sn atom expands 3.52-fold (96.7 Å$^3$/27.5 Å$^3$).

As described above, a negative electrode material containing SnO undergoes a remarkable volume change at the time of charge and discharge, and hence repeated charge and discharge is liable to generate a crack in the negative electrode material. If the crack develops, a void is formed in the negative electrode material in some cases, and the negative electrode material may come into fine powder. When a crack occurs in the negative electrode material, an electron-conducting network is divided. As a result, the charge-discharge capacity of the negative electrode material is liable to lower, causing the reduction of the cycle performance.

Further, a thermosetting resin is used as a binder in the present invention, and hence it is possible to prevent the negative electrode active material from being detached from the negative electrode material due to the volume change thereof at the time of charge and discharge. That is, as the thermosetting resin has the structure of having side chains branched from the main chain of a straight-chain polymer, heat treatment causes a cross-linking reaction between the side chains to proceed and the thermosetting resin can cover and solidify the negative electrode active material three-dimensionally, and hence the thermosetting resin is excellent in bondability. Thus, the thermosetting resin can inhibit the negative electrode active material from being detached from the negative electrode material and is excellent in bondability to a negative electrode current collector. Further, the thermosetting resin cures in an expanded state holding the negative electrode active material therein through heat treatment. When the cured substance is cooled, only the negative electrode active material contracts, and hence voids are formed between the negative electrode active material and the thermosetting resin. The voids serve as a space effective for abating the volume change of the active material attributed to charge and discharge.

Because of the reasons mentioned above, the negative electrode material of the present invention exhibits an excellent cycle performance when charge and discharge is repeated.

Note that the thermosetting resin is excellent in chemical resistance and heat resistance compared with a thermoplastic resin, and hence an electricity storage device produced by using the negative electrode material of the present invention is excellent in safety as well.

The negative electrode material for an electricity storage device of the present invention is preferable to further comprise a conductive agent.

The conductive agent forms an electron-conducting network in the negative electrode material, enabling the negative electrode material to have a higher capacity and a higher rate.

The negative electrode material for an electricity storage device of the present invention preferably comprises, in terms of mass %, 55 to 90% of the negative electrode active material, 5 to 30% of the binder, and 3 to 20% of the conductive agent.

In the negative electrode material for an electricity storage device of the present invention, the negative electrode active material preferably comprises a composition containing, in terms of mol %, 45 to 95% of SnO and 5 to 55% of $P_2O_5$.

In the negative electrode material for an electricity storage device of the present invention, the negative electrode active material is preferably substantially amorphous.

According to such construction, there is provided a negative electrode material that is capable of abating the volume change attributed to the storage and release of lithium ions, and hence it is possible to provide a secondary battery which has an excellent charge-discharge cycle performance. Note that the phrase "be substantially amorphous" means that no crystalline diffraction line is detected in powder X-ray diffraction measurement using Cu Kα-rays, and specifically refers to having a crystallinity of 0.1% or less.

In the negative electrode material for an electricity storage device of the present invention, the thermosetting resin preferably comprises a polyimide resin.

In the negative electrode material for an electricity storage device of the present invention, the conductive agent preferably comprises highly conductive carbon black.

Eighth, in the negative electrode material for an electricity storage device of the present invention, the electricity storage device comprises a non-aqueous secondary battery.

The present invention also provides a negative electrode for an electricity storage device, comprising a current collector having a surface coated with the negative electrode materials for an electricity storage device as described above.

The present invention also provides a method of producing the negative electrode for an electricity storage device as described above, the method comprising the steps of coating the surface of the current collector with the negative electrode material for an electricity storage device, and carrying out heat treatment of the current collector at 150 to 400° C. under reduced pressure.

According to the production method, when the thermosetting resin serving as a binder is cured, it is possible to remove water, an alcohol, or the like generated by a condensation reaction and it is also possible to remove, at the same time, undesirable water or an undesirable organic solvent existing in the negative electrode material. As a result, a secondary battery excellent in safety can be manufactured. Moreover, the heat treatment under reduced pressure can prevent the oxidation of the current collector and can suppress a reduction in electric conductivity as well.

DESCRIPTION OF EMBODIMENTS

In a negative electrode material of the present invention, a thermosetting resin is used as a binder. As the thermosetting resin, a thermosetting polyimide, a thermosetting polyamide-imide, a phenol resin, an epoxy resin, a urea resin, a melamine resin, an unsaturated polyester resin, or a polyurethane is preferred. Of those, a thermosetting polyimide is particularly preferred because it is excellent in chemical resistance, heat resistance, and crack resistance. Note that an imidized product may be used as each of the thermosetting polyimide and the thermosetting polyamide-imide. When the imidized thermosetting polyimide or the imidized thermosetting polyamide-imide is used, heat treatment time can be shortened and heat treatment temperature can be decreased as well in manufacturing a negative electrode.

In the negative electrode material of the present invention, the content of a negative electrode active material is, in terms of mass %, preferably 55 to 90%, 60 to 88%, 70 to 86%. When the content of the negative electrode active material is less than 55%, the charge-discharge capacity per unit mass of the negative electrode material becomes small and it is difficult to achieve a higher capacity. On the other hand, when the content of the negative electrode active material is more than 90%, a state in which the negative electrode active material is densely filled in the negative electrode material is caused, and hence the negative electrode material does not have an enough space necessary for abating a volume change attributed to charge and discharge. As a result, the cycle performance of the negative electrode material tends to deteriorate.

In the negative electrode material of the present invention, the content of a binder is, in terms of mass %, preferably 5 to 30%, 7 to 25%, 10 to 23%. When the content of the binder is less than 5%, bondability between the negative electrode active material and a conductive agent is poor, and hence the negative electrode active material is liable to be detached from the negative electrode material because of the volume change thereof at the time of repeated charge and discharge. As a result, the cycle performance tends to deteriorate. On the other hand, when the content of the binder is more than 30%, the binder is liable to interpose between the negative electrode active material and the conductive agent or between the conductive agents in the negative electrode material, and hence an electron-conducting network is divided. As a result, a higher capacity is not attained and high-rate performance remarkably deteriorates.

The negative electrode material of the present invention preferably comprises a conductive agent in order to attain a higher capacity and a higher rate. Specific examples of the conductive agent include highly conductive carbon black such as acetylene black and ketjen black, carbon powder such as graphite, and carbon fiber. Of those, highly conductive carbon black exhibiting excellent conductivity even when being added in a small amount is preferably used.

The content of the conductive agent is, in terms of mass %, preferably 3 to 20%, 4 to 15%, particularly preferably 5 to 13%. When the content of the conductive agent is less than 3%, an electron-conducting network sufficient for covering the negative electrode active material is not formed, and consequently, the capacity of the negative electrode material lowers and its high-rate performance also deteriorates remarkably. On the other hand, when the content of the conductive agent is more than 20%, the bulk density of the negative electrode material lowers, and consequently, the charge-discharge capacity per unit volume of the negative electrode material lowers and the strength of the negative electrode material also lowers.

The negative electrode material of the present invention may be in such a paste state that the negative electrode material is dispersed in an organic solvent such as N-methylpyrrolidone and homogeneously mixed.

SnO in the negative electrode active material in the negative electrode material for an electricity storage device of the present invention is an active material component serving as a site for storing and releasing lithium ions. The content of SnO is, in terms of mol %, preferably 45 to 95%, 50 to 90%, 55 to 87%, 60 to 85%, particularly preferably 68 to 83%. When the content of SnO is less than 45%, the charge-discharge capacity per unit mass of the negative electrode active material becomes smaller. When the content of SnO is more than 95%, the amount of amorphous components in the negative electrode active material becomes smaller, so that it is not possible to abate a volume change attributed to the storage and release of lithium ions at the time of charge and discharge, and consequently, a sharp reduction in discharge capacity may occur. Note that the content of the SnO component in the present invention refers to a total content additionally including the contents of tin oxide components (such as $SnO_2$) other than SnO, provided that the contents of the tin oxide components are calculated in terms of SnO.

$P_2O_5$ is a network-forming oxide, covers a site of SnO for storing and releasing lithium ions, and functions as a solid electrolyte in which lithium ions are movable. The content of $P_2O_5$ is, in terms of mol %, preferably 5 to 55%, 10 to 50%, particularly preferably 15 to 45%. When the content of $P_2O_5$ is less than 5%, it is not possible to abate the volume change of SnO attributed to the storage and release of lithium ions at the time of charge and discharge, resulting in its structural degradation, and hence the discharge capacity at the time of repeated charge and discharge is liable to reduce significantly.

When the content of P$_2$O$_5$ is more than 55%, a stable crystal (such as SnP$_2$O$_7$) is liable to be formed together with a Sn atom, bringing about such a state in that the influence of coordination bonds on a Sn atom due to lone pairs of electrons owned by each oxygen atom in chain P$_2$O$_5$ is stronger. As a result, the initial charge-discharge efficiency tends to lower.

By appropriately adjusting the molar ratio of SnO to P$_2$O$_5$ (SnO/P$_2$O$_5$), it is possible to cause Sn$^{x+}$ ions in the negative electrode material to be present in the state of being covered by a phosphate network, and hence the phosphate network can contribute to abating the volume change of Sn atom attributed to charge and discharge. As a result, a secondary battery excellent in the cycle performance at the time of repeated charge and discharge can be provided. Specifically, the molar ratio of SnO to P$_2$O$_5$ is preferably 0.8 to 19, 1 to 18, particularly preferably 1.2 to 17. When the SnO/P$_2$O$_5$ is less than 0.8, the Sn atom in SnO is liable to be influenced by the coordination of P$_2$O$_5$, and the valence of the Sn atom tends to become larger. As a result, the initial charge efficiency tends to lower. On the other hand, when the SnO/P$_2$O$_5$ is more than 19, the discharge capacity at the time of repeated charge and discharge is liable to lower. This is probably because the number of P$_2$O$_5$ coordinating to SnO decreases in the negative electrode material, P$_2$O$_5$ cannot sufficiently cover SnO, and consequently, it is not possible to abate the volume change of SnO attributed to the storage and release of lithium ions, causing its structural degradation.

Besides, various components can be further added to the negative electrode material of the present invention in addition to the above-mentioned components. For example, CuO, ZnO, B$_2$O$_3$, MgO, CaO, Al$_2$O$_3$, SiO$_2$, and R$_2$O (R represents Li, Na, K, or Cs) can be contained at a total content of 0 to 20%, 0 to 10%, particularly 0 to 7%. When the total content is more than 20%, the structure of the negative electrode material is liable to be disordered and an amorphous material can be easily obtained, but a phosphate network is liable to be cut. As a result, the volume change of the negative electrode active material attributed to charge and discharge cannot be abated, possibly resulting in the deterioration of the cycle performance of the negative electrode material.

The negative electrode active material in the negative electrode material for an electricity storage device of the present invention is formed of an amorphous substance and/or a crystalline substance containing, for example, a plurality of oxide components as its composition. The negative electrode active material in the negative electrode material for an electricity storage device of the present invention has a crystallinity of preferably 95% or less, 80% or less, 70% or less, 50% or less, particularly preferably 30% or less, and is most preferably substantially amorphous. As a negative electrode material containing SnO at a high ratio has a smaller crystallinity (has a larger ratio of an amorphous phase), the volume change at the time of repeated charge and discharge is more abated, which is advantageous from the viewpoint of suppressing the reduction of a discharge capacity.

The crystallinity of a negative electrode active material is determined by carrying out peak separation to each crystalline diffraction line and an amorphous halo in a diffraction line profile ranging from 10 to 60° in terms of a 2θ value obtained by powder X-ray diffraction measurement using Cu Kα-rays. Specifically, when an integral intensity obtained by carrying out the peak separation of a broad diffraction line (amorphous halo) in the range of 10 to 45° from a total scattering curve obtained by performing background subtraction from the diffraction line profile is defined as Ia, and the total sum of integral intensities obtained by carrying out the peak separation of each crystalline diffraction line detected in the range of 10 to 60° from the total scattering curve is defined as Ic, the crystallinity Xc can be calculated on the basis of the following equation.

$$Xc=[Ic/(Ic+Ia)]\times100$$

The negative electrode active material in the negative electrode material of the present invention may comprise a phase formed of a complex oxide of a metal and an oxide or an alloy phase of a metal and another metal.

Note that, after an electricity storage device using the negative electrode active material in the negative electrode material of the present invention is charged and discharged, the negative electrode active material contains lithium oxides, a Sn—Li alloy, or metal tin in some cases.

The negative electrode active material in the negative electrode material for an electricity storage device of the present invention is produced by, for example, melting raw material powder under heating, thereby causing the vitrification thereof. Here, the melting of the raw material powder is preferably carried out in a reductive atmosphere or an inert atmosphere.

In an oxide containing Sn, the oxidation state of a Sn atom easily changes depending on melting conditions, and hence, when melting is carried out in an air atmosphere, an undesirable SnO$_2$ crystal, an undesirable SnP$_2$O$_7$ crystal, and the like are liable to be formed in the surface of a melt or inside of a melt. As a result, the initial charge-discharge efficiency and the cycle performance of the negative electrode material may deteriorate. Thus, when melting is carried out in a reductive atmosphere or an inert atmosphere, the increase of the valence of a Sn ion in the negative electrode active material can be suppressed to suppress the formation of undesirable crystals, and consequently, an electricity storage device excellent in initial charge-discharge efficiency and cycle performance can be provided.

In order to carry out melting in a reductive atmosphere, it is preferred to supply a reductive gas into a melting tank. It is preferred to use, as the reductive gas, a mixed gas comprising, in terms of vol %, 90 to 99.5% of N$_2$ and 0.5 to 10% of H$_2$, particularly comprising 92 to 99% of N$_2$ and 1 to 8% of H$_2$.

When melting is carried out in an inert atmosphere, it is preferred to supply an inert gas into a melting tank. It is preferred to use, as the inert gas, any of nitrogen, argon, and helium.

The reductive gas or the inert gas may be supplied into the upper atmosphere of molten glass in a melting tank, or may be directly supplied into molten glass from a bubbling nozzle. Both methods may be carried out at the same time.

Further, in the method of producing the negative electrode active material in the negative electrode material for an electricity storage device of the present invention, it is preferred to use a complex oxide containing phosphorus and tin as starting raw material powder. When the complex oxide containing phosphorus and tin is used as the starting raw material powder, it is easier to produce a negative electrode material containing less devitrified material and being excellent in homogeneity. The use of such the negative electrode material as an electrode allows the provision of an electricity storage device having a stable discharge capacity. Examples of the complex oxide containing phosphorus and tin include stannous pyrophosphate (Sn$_2$P$_2$O$_7$).

When the negative electrode material for an electricity storage device of the present invention is used to coat the surface of, for example, a metal foil serving as a current collector, the resultant can be used as a negative electrode for an electricity storage device. It is recommended that the thickness of the negative electrode material be suitably adjusted depending on targeted battery capacities, and the thickness is, for example, preferably 1 to 250 µm, 2 to 200 µm, 3 to 150 µm. When the thickness of the negative electrode material is more than 250 µm, in a case where the negative electrode is used in a folded state in a battery, a tensile stress is liable to occur in the surface of the negative electrode material. Thus, a crack is liable to be generated due to the volume change of the negative electrode active material at the time of repeated charge and discharge, and consequently, the cycle performance tends to deteriorate remarkably. On the other hand, when the thickness of the negative electrode material is less than 1 µm, there exists a portion partially where the binder cannot cover the negative electrode active material, and consequently, the cycle performance tends to deteriorate.

The negative electrode for an electricity storage device of the present invention is preferably produced by coating the surface of the current collector with the negative electrode material and then carrying out heat treatment of the current collector at 150 to 400° C. under reduced pressure. When the temperature of heat treatment is less than 150° C., a thermosetting resin cures insufficiently, resulting in poor bondability, there exists a portion partially where the binder cannot cover the negative electrode active material, and consequently, the cycle performance tends to deteriorate. Further, water having been adsorbed on the negative electrode material cannot be removed sufficiently, and hence, the water splits in an electricity storage device, releasing oxygen to cause an explosion, or heat is generated through a reaction between lithium and the water, causing ignition, which result in poor safety. On the other hand, when the temperature of heat treatment is more than 400° C., a thermosetting resin is liable to be decomposed. As a result, there exists a portion partially where the binder cannot cover the negative electrode active material, and consequently, the cycle performance tends to deteriorate. The temperature of heat treatment is preferably in the range of 180 to 380° C., more preferably 200 to 360° C.

In the foregoing, description has been made mainly of a negative electrode material for a lithium ion secondary battery. However, the negative electrode material for an electricity storage device and the negative electrode for an electricity storage device using the same of the present invention are not limited thereto, and can also be applied to other non-aqueous secondary batteries and to, for example, a hybrid capacitor in which a negative electrode material for a lithium ion secondary battery and a positive electrode material for a non-aqueous electric double layer capacitor are combined.

A lithium ion capacitor, which is a hybrid capacitor, is a kind of asymmetric capacitor, in which the charge-discharge principle of a positive electrode and that of a negative electrode are different. The lithium ion capacitor has a structure in which a negative electrode for a lithium ion secondary battery and a positive electrode for an electric double layer capacitor are combined. Here, the positive electrode is charged and discharged through a physical action (static electricity action) of an electric double layer formed on its surface, whereas the negative electrode is charged and discharged through chemical reactions (storage and release) of Li ions, in the same manner as in a lithium ion secondary battery described previously.

There is used, for the positive electrode of the lithium ion capacitor, a positive electrode material formed of, for example, carbonaceous powder having a high specific surface area, such as powder of activated carbon, a polyacene, or mesophase carbon. On the other hand, it is possible to use, for the negative electrode, a material in which Li ions and electrons are stored in the negative electrode active material of the present invention.

There is no particular limitation to means for storing Li ions and electrons in the negative electrode active material of the present invention. For example, it is possible that a metal Li electrode serving as supply sources of Li ions and electrons is provided in a capacitor cell and is brought into contact with a negative electrode including the negative electrode material of the present invention directly or through an electric conductor, or it is possible that Li ions and electrons are preliminarily stored in the negative electrode material of the present invention in another cell and the cell is installed in a capacitor cell.

EXAMPLE

Hereinafter, as an example of the negative electrode material for an electricity storage device of the present invention, a negative electrode material for a non-aqueous secondary battery is described in detail by way of examples, but the present invention is not limited to these examples.

(1) Preparation of Negative Electrode Active Material for Non-Aqueous Secondary Battery Tables 1 to 3 show Examples 1 to 14 and Comparative Examples 1 to 8. Each negative electrode active material was prepared as follows.

Raw material powder was prepared by using a complex oxide of tin and phosphorus (stannous pyrophosphate: $Sn_2P_2O_7$) as the main raw material together with various oxides, a carbonate raw material, and the like, so that each composition shown in Tables 1 to 3 was attained. The raw material powder was fed into a quartz crucible and was melted in a nitrogen atmosphere at 950° C. for 40 minutes by using an electric furnace, causing vitrification thereof.

Next, the molten glass was poured between a pair of rotating rollers and was formed with the rotating rollers into a film-shaped glass having a thickness of 0.1 to 2 mm while being quenched. The film-shaped glass was fed into a ball mill containing zirconia balls each with diameters of 2 to 3 cm and was pulverized at 100 rpm for 3 hours. The pulverized glass was then passed through a resin sieve having a mesh size of 120 µm, obtaining glass coarse powder having an average particle diameter of 8 to 15 µm. Next, the glass coarse powder was fed into a ball mill containing zirconia balls each with a diameter of 5 mm, ethanol was added thereto, and the glass coarse powder was pulverized at 40 rpm for 5 hours, followed by drying at 200° C. for 4 hours, obtaining glass powder having an average particle diameter of 2 to 5 µm (a negative electrode active material).

Each sample was subjected to powder X-ray diffraction measurement to identify its structure. The negative electrode active materials of Examples 1 to 9 and 12 to 14 and Comparative Examples 1 to 4 and 6 were amorphous and no crystal was detected. The negative electrode active materials of Examples 10 and 11 and Comparative Examples 5 and 7 were almost amorphous, but a crystal was partially detected. The negative electrode active material of Comparative Example 8 had a crystallinity of almost 100%.

(2) Preparation of Negative Electrode for Non-Aqueous Secondary Battery

Each negative electrode active material obtained above, a conductive agent, and a binder were weighed so as to achieve each composition shown in Tables 1 to 3, and were dispersed in N-methylpyrrolidone (NMP), followed by sufficient stirring with a rotation-revolution mixer, obtaining a slurry. Here, in order to prepare the negative electrode materials of Examples 1 to 14 shown in Tables 1 and 2, ketjen black (hereinafter, abbreviated as "KB") was used as the conductive agent, a polyimide resin (hereinafter, abbreviated as "PI") was used as the binder in each of Examples 1 to 12, an imidized polyimide resin (hereinafter, abbreviated as "imidized PI") was used as the binder in Example 13, and an imidized polyamide-imide resin (hereinafter, abbreviated as "imidized PAI") was used as the binder in Example 14. In each of Comparative Examples 1 to 8 shown in Table 3, KB was used as the conductive agent and polyvinylidene fluoride (hereinafter, abbreviated as "PVDF"), which is a thermoplastic resin, was used as the binder.

Next, a doctor blade with an gap of 150 μm was used to coat a copper foil having a thickness of 20 μm and serving as a negative electrode current collector with the resultant slurry, and the coated copper foil was dried at 70° C. in a dryer and was then passed through and pressed between a pair of rotating rollers, obtaining an electrode sheet. In each of Examples 1 to 12, an electrode punching machine was used to punch a piece having a diameter of 11 mm out of the electrode sheet, and the piece was dried and simultaneously cured (imidized) at each thermal curing temperature shown in Table 1 for 10 hours under reduced pressure, obtaining a circular working electrode (negative electrode for a non-aqueous secondary battery). In each of Examples 13 and 14, an electrode punching machine was used to punch a piece having a diameter of 11 mm out of the electrode sheet, and the piece was dried at each heat treatment temperature shown in Table 2 for 3 hours under reduced pressure, obtaining a circular working electrode (negative electrode for a non-aqueous secondary battery). On the other hand, in each of Comparative Examples 1 to 8, an electrode punching machine was used to punch a piece having a diameter of 11 mm out of the electrode sheet, and the piece was dried at 140° C. for 4 hours under reduced pressure, obtaining a circular working electrode.

(3) Preparation of Test Battery

The working electrode was placed with its copper foil surface facing downward on a lower lid of a coin cell, and there were laminated, on the working electrode, a separator formed of a polypropylene porous film (Celgard #2400 manufactured by Hoechst Celanese Corporation) having a diameter of 16 mm, which had been dried under reduced pressure at 60° C. for 8 hours, and metal lithium serving as an opposite electrode, thus preparing a test battery. Used as an electrolytic solution was a 1 M $LiPF_6$ solution/EC: DEC=1:1 (EC=ethylene carbonate, DEC=diethyl carbonate). Note that the assembly of the test battery was carried out in an environment of a dew-point temperature of −60° C. or less.

(4) Charge-Discharge Test

Charge (storage of lithium ions in a negative electrode material) was carried out by 0.2 mA constant current (CC) charge from 2 V to 0 V. Next, discharge (release of lithium ions from the negative electrode material) was carried out by discharge at a constant current of 0.2 mA from 0 V to 2 V. This charge-discharge cycle was repeated.

Tables 1 and 2 show the results of the initial charge-discharge performance and the results of the cycle performance when repeated charge and discharge was carried out in the charge-discharge test for the batteries using the negative electrode materials of the examples and comparative examples.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Composition of negative electrode active material (mol %) | SnO | 68 | 68 | 71 | 71 | 71 | 76 | 76 | 81 | 81 | 86 | 86 | 63 |
| | $P_2O_5$ | 32 | 32 | 29 | 29 | 29 | 24 | 24 | 19 | 19 | 14 | 14 | 20 |
| | $Al_2O_3$ | | | | | | | | | | | | 3 |
| | $B_2O_3$ | | | | | | | | | | | | 11 |
| | MgO | | | | | | | | | | | | 3 |
| | SnO/$P_2O_5$ | 2.1 | 2.1 | 2.4 | 2.4 | 2.4 | 3.2 | 3.2 | 4.3 | 4.3 | 6.1 | 6.1 | 3.2 |
| Precipitated crystal | | Absent | Absent | Absent | Absent | Absent | Absent | Absent | Absent | Absent | $SnO_2$ | $SnO_2$ | Absent |
| Crystallinity (%) | | 0 | 0 | 0 | 0 | 0 | 0 | 0 | 0 | 0 | 4 | 4 | 0 |
| Composition of negative electrode material (mass %) | Negative electrode active material | 80 | 85 | 80 | 80 | 85 | 80 | 85 | 80 | 85 | 80 | 85 | 85 |
| | Binder PI | 15 | 10 | 15 | 15 | 10 | 15 | 10 | 15 | 10 | 15 | 10 | 10 |
| | Conductive agent KB | 5 | 5 | 5 | 5 | 5 | 5 | 5 | 5 | 5 | 5 | 5 | 5 |
| Heat treatment temperature (° C.) | | 200 | 200 | 200 | 300 | 200 | 200 | 200 | 200 | 200 | 200 | 200 | 200 |
| Charge-discharge performance | Initial charge capacity (mAh/g) | 1269 | 1146 | 1257 | 1355 | 1126 | 1274 | 1141 | 1427 | 1179 | 1375 | 1197 | 1133 |
| | Initial discharge capacity (mAh/g) | 741 | 670 | 752 | 833 | 685 | 762 | 692 | 888 | 783 | 916 | 863 | 677 |
| | Initial charge-discharge efficiency (%) | 58.4 | 58.5 | 59.8 | 61.5 | 60.8 | 59.8 | 60.6 | 62.2 | 66.4 | 66.6 | 72.1 | 59.8 |
| | Discharge capacity at 50th cycle (mAh/g) | 560 | 541 | 585 | 643 | 545 | 413 | 421 | 424 | 412 | 401 | 396 | 544 |

TABLE 2

|  |  | Example | |
|---|---|---|---|
|  |  | 13 | 14 |
| Composition of negative electrode active material (mol %) | SnO | 72 | 72 |
|  | P$_2$O$_5$ | 28 | 28 |
|  | Al$_2$O$_3$ |  |  |
|  | B$_2$O$_3$ |  |  |
|  | MgO |  |  |
|  | SnO/P$_2$O$_5$ | 2.1 | 2.1 |
| Precipitated crystal |  | Absent | Absent |
| Crystallinity (%) |  | 0 | 0 |
| Composition of negative electrode material (mass %) | Negative electrode active material | 85 | 85 |
|  | Binder | 10 Imidized PI | 10 Imidized PAI |
|  | Conductive agent KB | 5 | 5 |
| Heat treatment temperature (° C.) |  | 180 | 180 |
| Charge-discharge performance | Initial charge capacity (mAh/g) | 1137 | 1099 |
|  | Initial discharge capacity (mAh/g) | 678 | 671 |
|  | Initial charge-discharge efficiency (%) | 59.6 | 61.1 |
|  | Discharge capacity at 50th cycle (mAh/g) | 556 | 516 |

TABLE 3

|  |  | Comparative Example | | | | | | | |
|---|---|---|---|---|---|---|---|---|---|
|  |  | 1 | 2 | 3 | 4 | 5 | 6 | 7 | 8 |
| Composition of negative electrode active material (mol %) | SnO | 68 | 71 | 76 | 81 | 86 | 63 | 40 | 96 |
|  | P$_2$O$_5$ | 32 | 29 | 24 | 19 | 14 | 20 | 60 | 4 |
|  | Al$_2$O$_3$ |  |  |  |  |  | 3 |  |  |
|  | B$_2$O$_3$ |  |  |  |  |  | 11 |  |  |
|  | MgO |  |  |  |  |  | 3 |  |  |
|  | SnO/P$_2$O$_5$ | 2.1 | 2.4 | 3.2 | 4.3 | 6.1 | 3.2 | 0.7 | 24 |
| Precipitated crystal |  | Absent | Absent | Absent | Absent | SnO$_2$ | Absent | SnP$_2$O$_7$ | SnO$_2$ SnO |
| Crystallinity (%) |  | 0 | 0 | 0 | 0 | 4 | 0 | 24 | 96 |
| Composition of negative electrode material (mass %) | Negative electrode active material | 85 | 85 | 85 | 85 | 85 | 85 | 85 | 85 |
|  | Binder PVDF | 10 | 10 | 10 | 10 | 10 | 10 | 10 | 10 |
|  | Conductive agent KB | 5 | 5 | 5 | 5 | 5 | 5 | 5 | 5 |
| Charge-discharge performance | Initial charge capacity (mAh/g) | 1015 | 1029 | 1035 | 1073 | 1138 | 1065 | 943 | 1303 |
|  | Initial discharge capacity (mAh/g) | 521 | 605 | 592 | 678 | 750 | 651 | 392 | 901 |
|  | Initial charge-discharge efficiency (%) | 51.3 | 58.8 | 57.2 | 63.2 | 65.9 | 61.1 | 41.6 | 69.1 |
|  | Discharge capacity at 50th cycle (mAh/g) | 271 | 370 | 113 | 158 | 147 | 230 | 258 | 52 |

The initial discharge capacity of the battery using the negative electrode material of each of Examples 1 to 14 was 670 mAh/g or more and the discharge capacity thereof at the 50th cycle was as good as 396 mAh/g or more. On the other hand, the initial discharge capacity of the battery using the negative electrode material of each of Comparative Examples 1 to 8 was 392 mAh/g or more, but the discharge capacity thereof at the 50th cycle was as remarkably low as 370 mAh/g or less.

The invention claimed is:

1. A negative electrode material, comprising, in terms of mass %:
   55 to 90% of a negative electrode active material comprising a compound containing at least, in terms of mol %, 45 to 95% of SnO and 5 to 55% of P$_2$O$_5$;
   5 to 30% of a binder comprising a thermosetting resin, wherein the thermosetting resin comprises one of a thermosetting polyimide and a thermosetting polyamide-imide; and
   3 to 20% of a conductive agent.

2. The negative electrode material according to claim 1, wherein the negative electrode active material is substantially amorphous.

3. The negative electrode material according to claim 1, wherein the conductive agent comprises highly conductive carbon black.

4. A negative electrode, comprising a current collector having a surface coated with the negative electrode material according to claim 1.

5. A method of producing the negative electrode according to claim 4, the method comprising the steps of:
   coating the surface of the current collector with the negative electrode material; and
   carrying out heat treatment of the current collector at 150 to 400° C. under reduced pressure.

* * * * *